United States Patent [19]

Richter et al.

[11] Patent Number: 4,708,551
[45] Date of Patent: Nov. 24, 1987

[54] EXPANSION DOWEL ASSEMBLY

[75] Inventors: Hanno Richter, Unterhaching; Helmut Mirsberger; Raimer Uhlig, both of Munich; Manfred Haage, Waldachtal; Philipp Uebel, Prien, all of Fed. Rep. of Germany

[73] Assignee: Hilti Aktiengesellschaft

[21] Appl. No.: 689,664

[22] Filed: Jan. 8, 1985

[30] Foreign Application Priority Data

Jan. 9, 1984 [DE] Fed. Rep. of Germany ....... 3400474

[51] Int. Cl.$^4$ .......................... F16B 13/06; F16B 13/00
[52] U.S. Cl. ........................................ 411/32; 411/57; 411/913; 52/513
[58] Field of Search .................... 411/32, 71, 73, 44, 411/45, 57, 339, 508, 509, 510, 512, 913; 52/513

[56] References Cited

U.S. PATENT DOCUMENTS

| | | | |
|---|---|---|---|
| 3,232,163 | 2/1966 | Croessant | 411/73 |
| 3,491,649 | 1/1970 | Smouton et al. | 411/43 |
| 3,662,644 | 5/1972 | Flesch et al. | 411/32 |
| 3,854,374 | 12/1974 | Boyle et al. | 411/57 |
| 4,088,054 | 5/1978 | Lippacher et al. | 411/57 |

FOREIGN PATENT DOCUMENTS

| | | | |
|---|---|---|---|
| 2714503 | 10/1978 | Fed. Rep. of Germany | 52/513 |
| 2908535 | 9/1980 | Fed. Rep. of Germany | 411/57 |

Primary Examiner—Neill Wilson
Attorney, Agent, or Firm—Toren, McGeady & Associates

[57] ABSTRACT

An expansion dowel assembly is adapted to secure fastening plates in spaced relation onto a structure. The expansion dowel assembly includes an axially extending sleeve-like member including an expansion section arranged to be secured into the structure and a collar section. The collar section engages the facing plate between a bearing and an abutment. An axially extending part of the collar section between the bearing and the abutment is arranged to collapse in the axial direction so that the space between the bearing and the abutment corresponds to the wall thickness of the facing plate. The axially collapsible part permits the expansion dowel assembly to be used with facing plates of different thicknesses.

4 Claims, 11 Drawing Figures

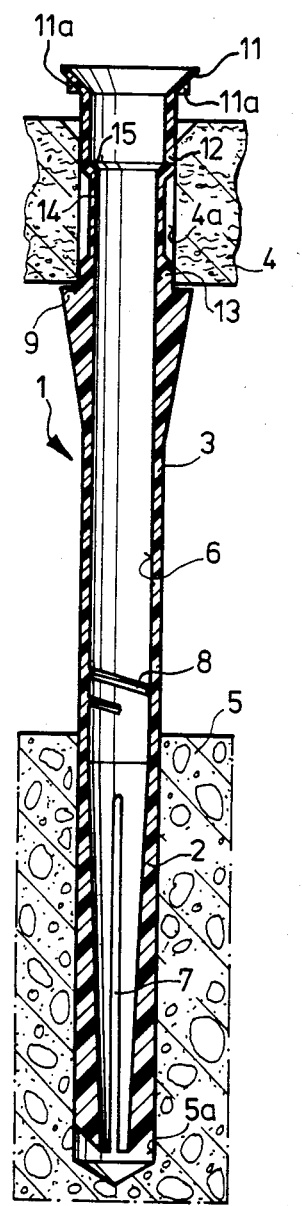
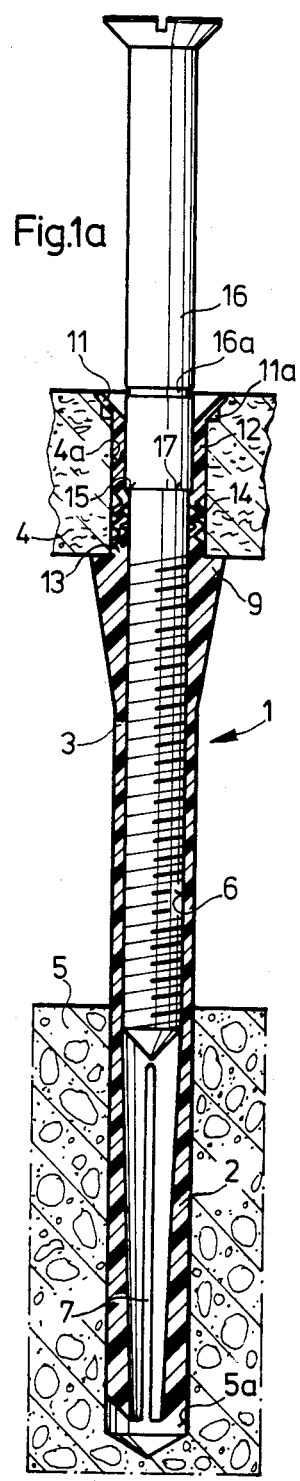
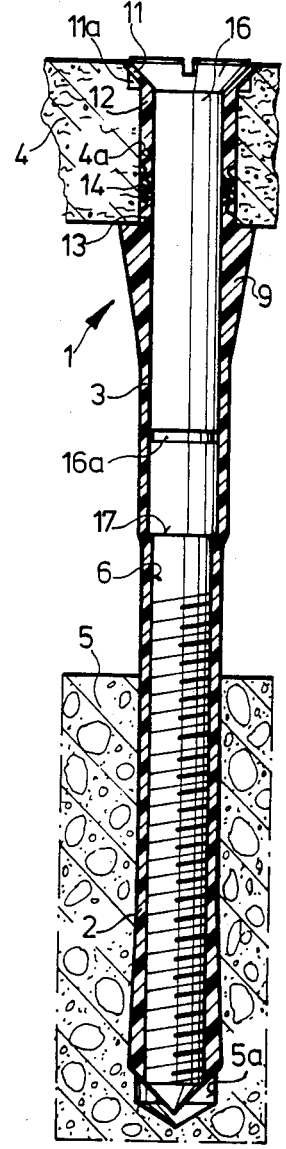

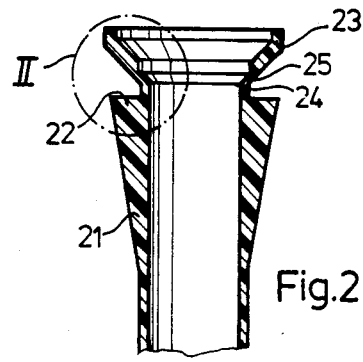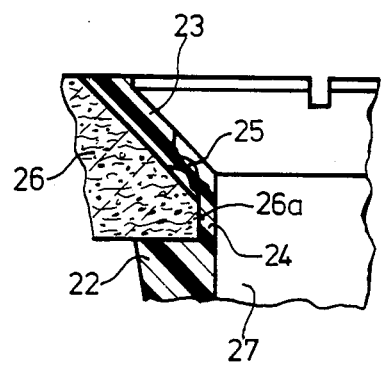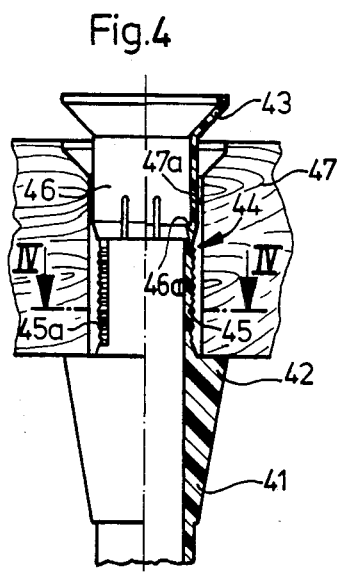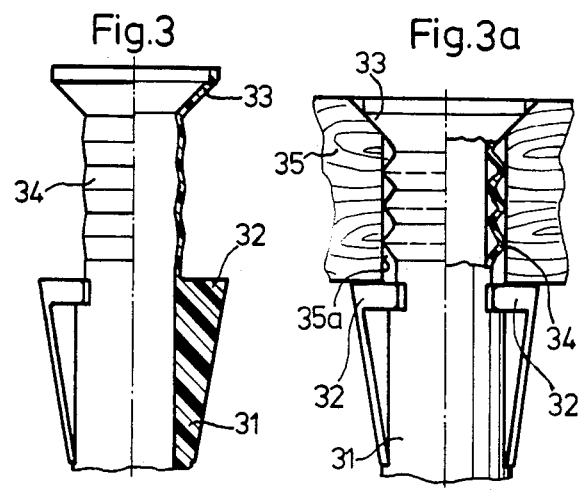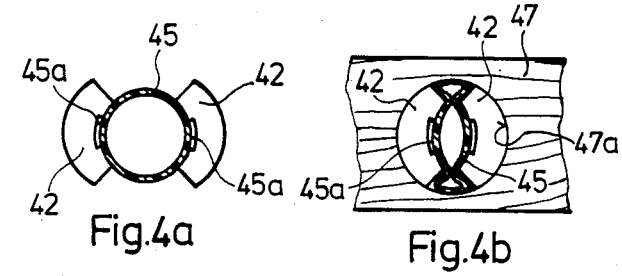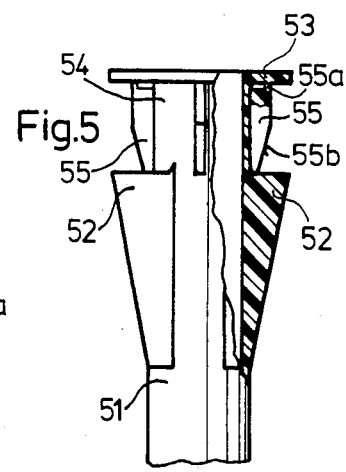

EXPANSION DOWEL ASSEMBLY

BACKGROUND OF THE INVENTION

The present invention is directed to an expansion dowel assembly for securing facing plates in spaced relation to a structure, such as a building, and the assembly includes a sleeve-like member and an expanding element. The sleeve-like member includes an axially extending expansion section arranged to be inserted into an opening or borehole in the structure and a collar section connected to the expansion section and arranged to extend through the facing plate. The collar section has a bearing and an abutment so that the bearing contacts one surface of the facing plate and the abutment contacts the other.

There is a known expansion dowel for the spaced attachment of facing plates on a structure where the dowel includes a collar section with a bearing and an abutment which bear against the opposite surfaces of the facing plates. In such a dowel, the spacing between the bearing and the abutment corresponds to the thickness of the plate to be supported. As a result, this known dowel is suitable only for a given plate thickness.

SUMMARY OF THE INVENTION

Therefore, the primary object of the present invention is to provide an expansion dowel assembly for securing facing plates on and in spaced relation with a structure. The assembly includes a sleeve-like member suitable for insertion through the facing plate and it is constructed for holding various thicknesses of the facing plates between a bearing and an abutment.

In accordance with the present invention, the axially extending part of the collar section located between the bearing and the abutment is formed so that it is axially collapsible at least along a portion of its length.

The axially extending part between the bearing and the abutment on the collar section is arranged to extend through an opening in the facing plate and it is adaptable to various plate thicknesses. The plate thickness can be varied from the distance between the bearing and the abutment in the original condition of the sleeve-like member and a portion of such distance. Accordingly, the expansion dowel assembly embodying the present invention is suitable for a range of facing plate thicknesses.

The expansion section and the collar section can be produced as a single part by injection molding. It is also possible to form the expansion section and the collar section as separate parts, for example, from plastics materials having different strengths, and to join the two sections together in a known manner to form a sleeve-like unit.

It is advisable to form the collar section so that it provides a seal against the entry of corrosion producing liquid into the dowel assembly section within the facing plates.

The part of the collar section between the bearing and the abutment can be axially collapsible along its entire length to afford a wide range of adaptability for facing plates of different thicknesses. The axially extending part between the bearing and the abutment must be capable of absorbing considerable transverse or shearing forces especially for the attachment of heavy facing plates. Therefore, it is advantageous to construct the part of the collar section between the bearing and the abutment so that it is axially collapsible in the region adjacent the abutment whereby sufficient strength is available for absorbing transverse forces.

In addition, it is also possible to form the collar section so that it is axially collapsible between the bearing and the abutment in the region adjacent to the bearing. In such an embodiment the portion of the part adjacent to the abutment engages in the opening through the facing plate and affords a radial guiding function. The axial collapsibility of the part of the collar section extending between the bearing and the abutment is advantageously achieved in a simple manner by providing at least a portion of the part with a reduced wall thickness relative to the remainder of the part. When the expansion element, constructed as a screw, is driven into the sleeve-like member, the head of the screw bears against the abutment and displaces the abutment against the outwardly facing surface of the facing plate and also effects the axially upsetting or collapsing of the portion having the smaller wall thickness. As a result of the upsetting action, the portion of the part between the bearing and the abutment expands outwardly against the wall of the opening through the facing plate. To obtain the displacement of the wall thickness of the portion in the axially collapsible part, it can be tapered in a middle portion between the bearing and the abutment or a first buckling location can be formed by a convex portion in the axially collapsible part.

To prevent the overstressing in the axially collapsing part while providing for the maximum axial collapsibilty so that a uniform deformation of the part is achieved, in another embodiment of the invention, the part is formed in a bellows-like manner. With a selection of the distance between the folds in the axially collapsible part, radial widening during axial collapsibility can be influenced.

In still another embodiment of the invention the axially collapsible part can be made up of two axially extending portions which can be fitted one into the other in a telescope-like manner. Such an embodiment is advantageous when the expansion dowel assembly is used for supporting pressure-sensitive plates, since there is no radial expansion of the axially collapsible part during the maximum reduction in its length and, as a result, there is no expansion pressure directed against the material forming the facing plate.

Yet another feature of the invention is the provision of locking means for obtaining axial locking of the assembly. Accordingly, it is possible to fix the axially extending sections of the sleeve-like member by pushing connecting pieces one into another and locking them together. In the next step, the facing plate is fixed at the desired distance relative to the structure by inserting the expansion section into the receiving opening in the structure with the subsequent anchoring taking place by driving the expansion element into the sleeve-like member.

In the axially collapsible parts which have a small wall thickness along their entire length as compared to the remainder of the collar section, it is advisable to provide centering means when inserting the collar section through the openings in the facing plates and the centering action can be maintained until there is satisfactory contact of the abutmant with the surface of the facing plate. Accordingly, the axially collapsible section is provided with axially extending angularly spaced centering ribs extending along at least a portion of its length. These centering ribs can be tapered inwardly in the insertion direction of the assembly so that they afford additional axial fixing of the plates as the plates are contacted by the bearing.

A further feature of the invention is the provision of a stop in the central bore extending through the sleeve-like member closer to the trailing end of the collar section so that the stop can be contacted by a shoulder on the expansion element. Such an embodiment is especially advantageous if the stop is located in the region adjacent to the bearing so that it affords axial reducability because of a small wall thickness. During a first phase of the process of inserting the expansion dowel assembly, the shoulder on the expansion elements abuts against the stop and affords an axial collapse of the part in between the bearing and the abutment with the facing plate being secured relative to the collar section of the dowel assembly by driving the expansion element forward toward the structure. In a second phase, the spacing plates from the structure can be adjusted as desired by displacing the expansion section within the structure with the completion of the process being obtained by completing the driving of the expansion element into the sleeve-like member.

The various features of novelty which characterize the invention are pointed out with particularity in the claims annexed to and forming a part of this disclosure. For a better understanding of the invention, its operating advantages and specific objects obtained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of the sleeve-like member of the expansion dowel assembly inserted into but not anchored to the structure;

FIG. 1a is a view, similar to FIG. 1, however, with the sleeve-like member deformed into supporting contact with the facing plate;

FIG. 1b is a view similar to FIGS. 1 and 1a showing the expansion dowel assembly in the anchored position;

FIG. 2 is a partial axially extending sectional view of another embodiment of the sleeve-like member shown in FIG. 1;

FIG. 2a is an enlarged detail view of the encircled portion II in FIG. 2 with the sleeve-like member secured to a facing plate;

FIG. 3 is another embodiment of the sleeve-like member shown partly in elevation and partly in axial section;

FIG. 3a is a view similar to FIG. 3 with the sleeve-like member holding a facing plate;

FIG. 4 is still another embodiment of the sleeve-like member, similar to FIG. 2, inserted through a facing plate but not completely engaging the plate;

FIG. 4a is a sectional view through the sleeve-like member taken along the line IV-IV in FIG. 4;

FIG. 4b is a sectional view of the portion of the sleeve-like member shown in FIG. 4 while the portion is being inserted through a facing plate; and FIG. 5 is a partial elevational view, partly in section, of a further embodiment of the sleeve-like member of the expansion dowel assembly embodying the present invention.

DETAILED DESCRIPTION OF THE INVENTION

In FIG. 1 a sleeve-like member forms a part of an expansion dowel for securing a facing plate 4 in spaced relation onto a structure 5. The axially extending sleeve-like member has a leading end shown inserted into the structure 5 and a trailing end extending slightly outwardly from the outwardly facing surface of the facing plate 4 in FIG. 1. The sleeve-like member is formed of an axially extending expansion section 2 extending from the leading end toward the trailing end and an axially extending collar section 3 extending from the trailing end of the expansion section to the trailing end of the sleeve-like member. The sleeve-like member 1 is inserted through the opening 4a in the facing plate with the expansion section 2 extending through the opening or borehole 5a in the structure.

Sleeve-like member 1 has a central bore or opening 6 extending from the trailing end to the leading end. Expansion section 2 is provided with an axially extending slot 7 from the leading end to adjacent trailing end of the expansion section. Within the expansion section 2, the bore 6 narrows inwardly to the leading end of the sleeve-like member. The reduced diameter bore in the expansion section is provided by increasing the wall thickness of the expansion section. The collar-like section 3 extending from the transition with the expansion section to adjacent the trailing end has a uniform inside diameter. Within the collar section 3 adjacent the transition with the expansion section 2, a thread 8 is formed in the bore 6. Intermediate the trailing end of the expansion section and the trailing end of the collar part web-like bearings 9 are formed projecting radially outwardly from the outside surface of the collar section. These web bearings are displaceable radially inwardly so that it can be inserted through the opening 4a in the facing plate 4. The bearings 9 extend along a circular arc about the outside surface of the collar section, that is, each bearing extends for only a portion of the circumference of the collar section 3. As can be seen in FIG. 1, the arc-like projecting bearings 9 on the opposite sides of the sleeve-like member can be displaced radially inwardly when sleeve-like member is inserted through the opening 4a in the plate. Accordingly, in its deformed condition the radius of the projecting bearings is smaller than the radius of the opening 4a in the plate 4. A head-like abutment 11 is formed at the trailing end of the collar section with the abutment projecting radially outwardly from the adjacent part of the collar section. The abutment tapers conically outwardly from the adjacent part of the collar section and has projections 11a extending outwardly from its outside surface. A closed axially extending part 12 extends axially between the bearing 9 and the abutment 11. At its end adjacent the bearing 9, the section 12 has an outwardly extending centering projection 13. This projection extends only for a small axial length of the part 12. The outside diameter of the projection 13 is similar to the inside diameter of the opening 4a in the plate 4. A reduced outside diameter portion 14 extends axially from the projection 13 toward the abutment and terminates at a location spaced axially from the abutment. To provide a lock preventing rotation in the opening 4a of the plate 4, the centering projection 13 has engaging edges or similar protuberances. At the end of the portion 14 closer to the abutment 11, the inside and outside surfaces of the part 12 step outwardly forming an inside shoulder 15 in the bore within the sleeve-like member 1. The outside surface of the part 12 extending from the step to the abutment has approximately the same diamter as the inside of the plate. In addition, in this region of the part 12, adjacent the abutment 11, projections can be provided on the outside surface for preventing relative rotation.

To fix the plate 4 relative to the collar section 3, an expansion element 16, note FIG. 1a, in the form of a screw, is pushed into the bore 6 until it reaches the thread 8. Subsequently, by rotating the expanding element 16, it is threaded more deeply into the sleeve-like member 1 due to the thread 8. As the expansion element 16 is moved axially into the bore 6 moving into the expansion section 2, a shoulder 17 formed on the expansion element moves into contact with the shoulder or stop 15 and presses the part 12 axially inwardly toward the bearing 9 until the abutment 11 is in contact with the countersunk portion of the opening 4a. As a result, the projections 11a on the outside surface of the abutment engage the plate 4 and hold the sleeve-like member against rotation relative to the plate. As can be seen in FIG. 1a the axially extending portion 14 is upset radially and collapsed axially so that it is in contact with the surface of the opening 4a and with the surface of the expansion element 16. The position of the expansion element 16 with the facing plate 4 held between the bearing 9 and the abutment 11 is signalled when the groove-like marking 16a on the element is flush outwardly facing surface of the plate.

In the position shown in FIG. 1a, the sleeve-like member is not yet anchored in the borehole 5a of the structure 5 with the desired spaced position established between the structure 5 and the plate 4. Next, the expansion element 16 is fully screwed into the expansion section 2 of the sleeve-like member 1 with the anchoring being effected as the expansion element moves through the inwardly tapering part of the bore 6 in the sleeve-like member, note FIG. 1b. The increased diameter part of the expansion element 16 adjacent the shoulder 17 presses against the inside surface of the axially collapsed portion 14 providing, in combination with the surface of the opening 4a in the facing plate 4 a tight engagement of the portion 14 along with a tight engagement of the plate between the bearing 9 and the abutment 11. The compression of the portion 14 holds the plate along with the contact between the bearings 9 and the abutment 11.

In FIG. 2 a portion of collar section 21 is shown with a different collapsible section. This collar section is suitable for bridging small thickness differences in facing plates. The collar section 21 has bearings 22 spaced from the abutment 23. Portion 24 extending from the bearings 22 toward the abutment 23 has a reduced cross-section area 25 adjacent the abutment 23 as can be seen in FIG. 2a, the collar section 21 secures a facing plate 26 between the bearings 22 and the abutment 23 with the axially extending portion 24 located in the opening 26a. When the expansion element 27 is moved through the collar section 21, the head of the expansion element compresses the region 25 causing it to shorten axially and being upset radially. As a result, the plate 26 is held securely between the bearings 22 and the abutment 23.

In FIG. 3 a collar part 31 is shown of another sleeve-like member with the collar part including a bearing 32 spaced axially from an abutment 33. A tubular portion 34 extends between the bearing 32 and the abutment 33 and is shaped in the manner of a bellows or a corrugated pipe section. The bellows-like arrangement facilitates the radial upsetting of the portion 34.

In FIG. 3a the collar part is shown securing a facing plate 35 with the plate held between the bearings 32 and the abutment 33. The axial length of the portion 34 as shown in FIG. 3 has been reduced as shown in FIG. 3a and has also been upset radially so that a portion of the outside surface contacts the openings through the facing plate 35 and a portion of its inside surface contacts the surface of the expansion element.

In FIG. 4 the trailing end part of a collar section 41 is shown positioned within a facing plate 47, however, the part 44 located between the bearing 42 and the abutment 43 has not been shortened in the axial direction. Part 44 is formed of a lower connecting piece 45 extending from the bearings 42 and an upper connecting piece 46 extending between the trailing end of connecting piece 45 and the abutment 43. The lower connecting piece 45 is dimensioned so that it can slide in a telescoping manner into the upper connecting piece 46 whereby the overall axial length of the part 44 can be reduced. On the outside surface of the lower connecting piece 45 there are two diametrically opposite toothed strips 45a arranged to engage catch projections 46a located adjacent the transition between the upper connecting piece 46 and a lower connecting piece 45. When the connecting pieces are telescoped one within the other the teeth on the strip 45a interengage with the projections 46a locking the toothed sections together.

In FIG. 4, the axially extending part 44 extends through the opening 47a in plate 47. As mentioned above, an expansion element is driven forwardly into the sleeve-like member to fix the plate 47 between the abutment 43 and the bearings 42 by axially collapsing the part 44, that is, by telescoping the two pieces of the part one into the other. In addition, the expansion element is driven into the leading end part of the sleeve-like member to secure it within the structure.

In FIG. 4a, a cross-sectional view of the part 44 is provided showing the lower connecting piece with the toothed strips 45a. In addition, the bearings 42 are shown on diametrically opposite sides of the collar section 41.

Initially, the sleeve-like member is inserted through the fastening plate and into the bore formed in the structure. The trailing end portion of the collar 41 is pushed through the opening 47a in the facing plate 47 until the abutment seats within the countersunk part of the plate. As the collar section 41 is inserted through the opening 47a in the plate 47 the axially extending part including the bearings 42 is collapsed radially inwardly accompanied by the deformation of the adjacent connecting piece 45 so that the collar section assumes the configuration shown in FIG. 4b. After the bearings 42 pass through the plate 47 the bearings rebound radially outwardly to their original positions and engage the inside surface of the plate 47 facing toward the structure. Further, when the expansion element is placed through the sleeve-like member it secures the bearings in the position as shown in FIG. 4.

In FIG. 5 a collar section 51 is displayed including a bearing 52 and an abutment 53 in axially spaced relation. A part 54 extends between the bearing 52 and the abutment 53 and relative to the other part of the collar section it has a smaller wall thickness so that it can be collapsed in the axial direction by buckling. Located on the outside surface of the part 54 are four centering ribs 55 equiangularly spaced apart about the circumference of the part and the ribs 55 are formed in an injection molding procedure. The ribs 55 are held relative to the abutment 53 by breakable connecting webs 55a. The lower part of the flank or radially outer surface of the ribs 55 taper inwardly toward the bearings 52. The object of the ribs 55 is to provide a centering alignment of the part 54 in the over-sized opening in the facing plate and also to assure that the part 54 contacts the abutment 53 in the preassembled state when the facing plates are very thin relative to the length of the part 54. This feature is achieved by narrowing the flank 55b which contacts the surface of the opening through the facing plate providing a force component directed toward the bearings 52. If the opening through the facing plate has a diameter corresponding approximately to the outside diameter of the part 54, the centering ribs 55 pivot in the circumferential direction and the connecting webs 55a have broken before this takes place. Accordingly, the webs 55a are arranged tangentially to the wall of the opening through the facing plate. The insertion and functioning of the expansion dowel assembly as shown in FIG. 5 is the same as set forth above.

While specific embodiments of the invention have been shown and described in detail to illustrate the application of the inventive principles, it will be understood that the invention may be embodied otherwise without departing from such principles.

We claim:

1. Expansion dowel assembly for use in the attachment of facing plates to and in spaced relation with a structure, comprising a monolithic axially extending sleeve-like member having a leading end to be inserted into the structure and a trailing end to be located at the surface of the facing plate facing outwardly from the structure, said sleeve-like member forming a central bore extending from the trailing end toward the leading end, said sleeve-like member comprising an axially extending expansion section extending from the leading end toward the trailing end and arranged to be inserted into a borehole in the structure, said central bore extending axially into said expansion section to at least adjacent the leading end of said sleeve-like member, and an axially extending collar section extending from the trailing end of said expansion to the trailing end of said sleeve-like member, said collar section including a bearing spaced axially between the trailing end of said expansion section and the trailing end of said sleeve-like member and arranged to be inserted through an opening in the facing plate and forming a bearing surface extending transversely of the axis of said sleeve-like member and arranged to bear against the surface of the facing plate directed toward the structure, an abutment at the trailing end of said monolithic sleeve-like member and arranged to bear against the surface of the facing plate directed away from the structure, said collar section further including an axially extending part disposed between and interconnecting said bearing and said abutment with at least an axially extending portion of said part being axially collapsible for adapting said part to the thickness dimension of the facing plate extending between the oppositely directed surfaces thereof, said bearing on said collar section is displaceable radially inwardly relative to said collar section axis along with the adjacent portion of said part extending between said bearing and said abutment so that said bearing can be displaced radially inwardly for passage through the opening in the facing plate, and an axially extending expansion element having a leading end and a trailing end and arranged to be inserted into the central bore in said sleeve-like member and means on said expansion element intermediate the leading and trailing ends thereof for engaging the surface of said central bore in the axially extending region of said part for collapsing said axially extending portion, said part of said collar section located between said bearing and said abutment has at least an axially extending portion thereof of a smaller thickness relative to the wall thickness of the remaining said collar section, said part of said collar section located between said abutment and said bearing has a step-like shoulder formed in the inner surface of said part in axially spaced relation to said abutment and said bearing surface and facing toward said abutment, said means on said expansion element comprises a correspondingly shaped stepped shoulder thereon arranged to contact said step-like shoulder in said part for axially collapsing said part as said expansion element is driven through said central bore into said expansion section.

2. Expansion dowel assembly, as set forth in claim 1, wherein said portion of said part of said collar section located between said bearing and said abutment is located adjacent to said abutment.

3. Expansion dowel assembly, as set forth in claim 1, wherein said portion of said part of said collar section located between said bearing and said abutment is formed adjacent to said bearing.

4. Expansion dowel assembly, as set forth in claim 1, 2 or 3, wherein at least said axially extending portion of said part of said collar section located between abutment and said bearing is in the form of a bellows-like member.

* * * * *